US011781704B2

(12) United States Patent
Barlettano

(10) Patent No.: US 11,781,704 B2
(45) Date of Patent: Oct. 10, 2023

(54) TABLET HOLDER

(71) Applicant: Ontel Products Corporation, Fairfield, NJ (US)

(72) Inventor: Scott Barlettano, Wayne, NJ (US)

(73) Assignee: Ontel Products Corporation, Fairfield, NJ (US)

( * ) Notice: Subject to any disclaimer, the term of this patent is extended or adjusted under 35 U.S.C. 154(b) by 226 days.

(21) Appl. No.: 17/234,390

(22) Filed: Apr. 19, 2021

(65) Prior Publication Data

US 2022/0333731 A1 Oct. 20, 2022

(51) Int. Cl.
| F16M 11/10 | (2006.01) |
| A45C 9/00 | (2006.01) |
| F16M 11/04 | (2006.01) |
| A45C 11/00 | (2006.01) |

(52) U.S. Cl.
CPC .............. *F16M 11/10* (2013.01); *A45C 9/00* (2013.01); *F16M 11/041* (2013.01); *A45C 2011/003* (2013.01); *A45C 2200/15* (2013.01); *F16M 2200/022* (2013.01); *F16M 2200/024* (2013.01)

(58) Field of Classification Search
CPC ............ F16M 11/10; F16M 2200/022; F16M 2200/024; A45C 2011/003; A45C 2200/15; A45C 2013/025; A45F 2200/0525; A47B 23/043
See application file for complete search history.

(56) References Cited

U.S. PATENT DOCUMENTS

| 1,203,659 | A | | 11/1916 | Smith | |
| 3,991,967 | A | * | 11/1976 | Sack | A47B 23/043 248/456 |
| 4,518,140 | A | | 5/1985 | Ferranto | |
| 4,555,128 | A | * | 11/1985 | White | B42D 9/00 281/31 |
| 4,998,703 | A | * | 3/1991 | Stewart | A47B 23/06 248/446 |
| 5,582,382 | A | * | 12/1996 | Pan-Yang | A47B 23/043 248/456 |
| 5,651,525 | A | * | 7/1997 | Yang | A47B 23/043 248/447 |
| 7,770,864 | B2 | * | 8/2010 | Phifer | A47B 23/043 248/455 |
| 7,828,260 | B2 | * | 11/2010 | Hauser | A47B 23/043 248/920 |
| 8,123,189 | B2 | * | 2/2012 | Phifer | A47B 23/044 190/30 |
| 8,347,792 | B2 | * | 1/2013 | Lopez, Jr. | A47B 96/027 108/42 |
| 8,387,938 | B2 | | 3/2013 | Lin | |

(Continued)

*Primary Examiner* — Bradley Duckworth
(74) *Attorney, Agent, or Firm* — Dickinson Wright PLLC

(57) ABSTRACT

A tablet holding assembly for holding a readable medium at various viewing angles. The tablet holding assembly comprises a base portion for placement on a surface and an adjustable portion including a ledge for holding the readable medium. The base portion includes a base knuckle and the adjustable portion includes an adjustable knuckle aligned with the base knuckle. A hinge assembly including at least one pin extends through the base knuckle and the adjustable knuckle to pivotally connect the base portion to the adjustable portion permitting the adjustable portion to be pivoted between viewing angles.

19 Claims, 16 Drawing Sheets

(56) References Cited

U.S. PATENT DOCUMENTS

| | | | |
|---|---|---|---|
| 8,567,740 B2* | 10/2013 | Tarnutzer | B42D 9/00 |
| | | | 361/679.55 |
| D693,824 S | 11/2013 | Erdfarb | |
| 8,844,892 B2* | 9/2014 | Robinson | A47B 23/043 |
| | | | 248/455 |
| 9,103,150 B1 | 8/2015 | Wong | |
| 9,557,002 B2 | 1/2017 | Wong et al. | |
| 9,642,453 B2* | 5/2017 | Feinberg | A47B 23/043 |
| 10,125,915 B1* | 11/2018 | Phifer | F16M 13/00 |
| 10,514,126 B2* | 12/2019 | Asante | A47B 21/04 |
| RE48,479 E | 3/2021 | Cannon et al. | |
| 2007/0151487 A1* | 7/2007 | Villapanda | A47B 23/043 |
| | | | 108/43 |
| 2011/0149510 A1* | 6/2011 | Monsalve | F16M 11/38 |
| | | | 361/679.55 |
| 2012/0261541 A1* | 10/2012 | Lai | F16M 13/00 |
| | | | 248/346.5 |
| 2015/0041609 A1* | 2/2015 | Lee | F16M 11/2021 |
| | | | 248/447 |
| 2015/0115124 A1 | 4/2015 | Cannon et al. | |
| 2019/0017648 A1 | 1/2019 | Li | |
| 2020/0393079 A1 | 12/2020 | Townsend | |

\* cited by examiner

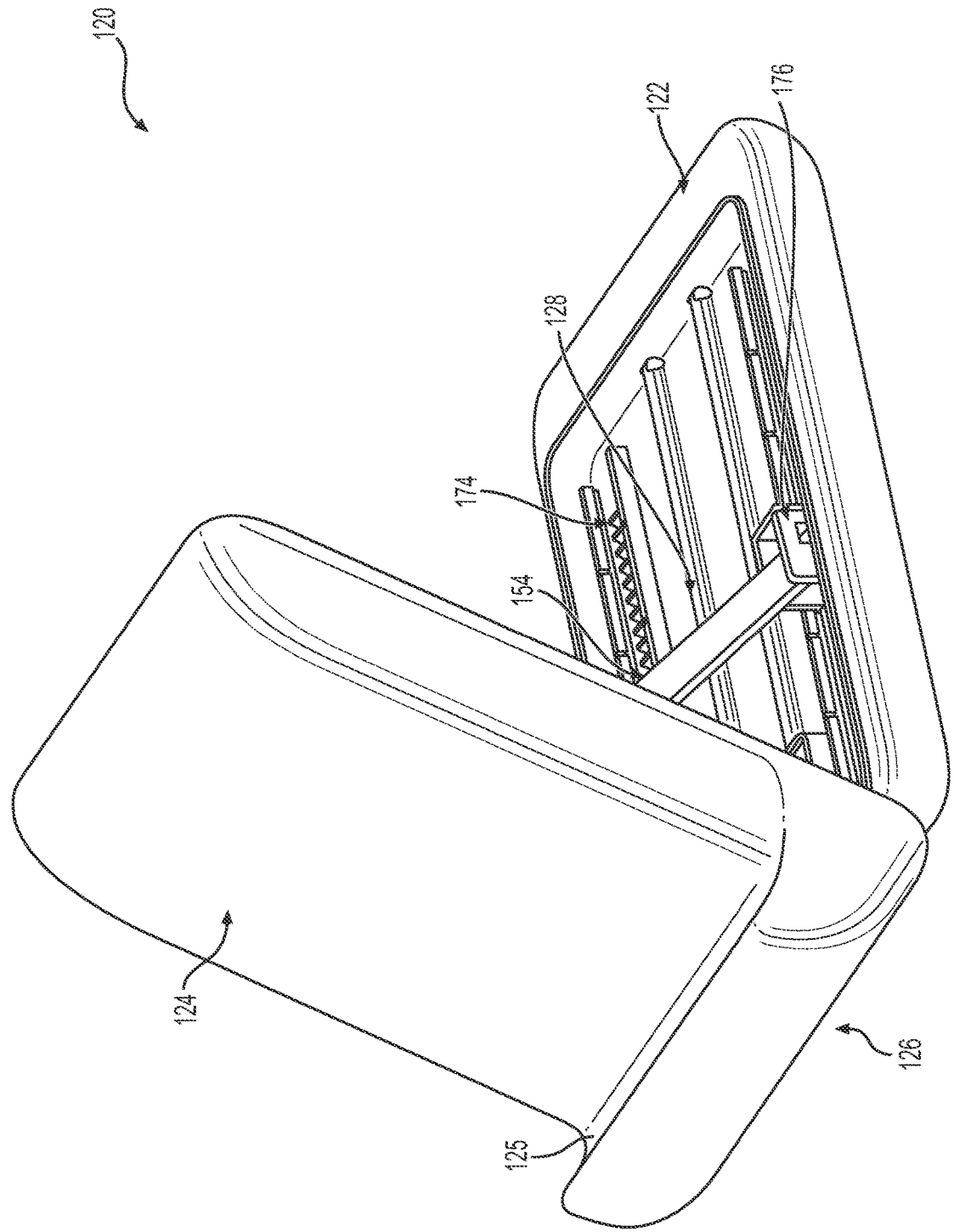

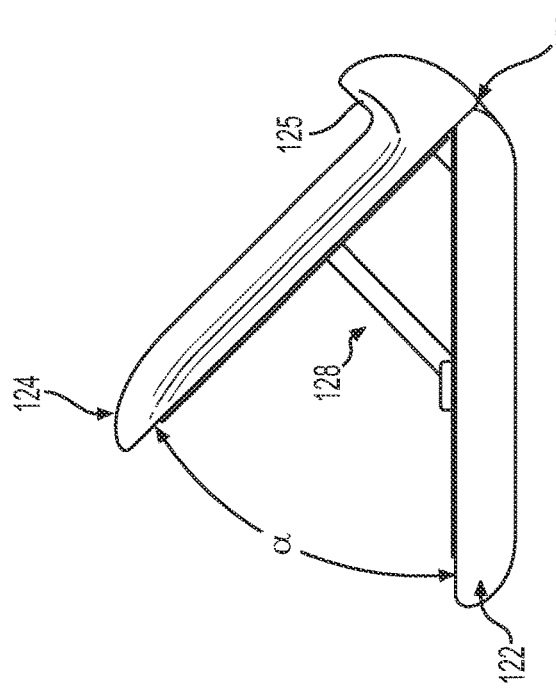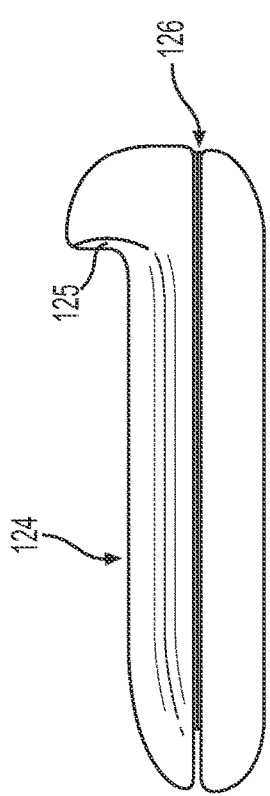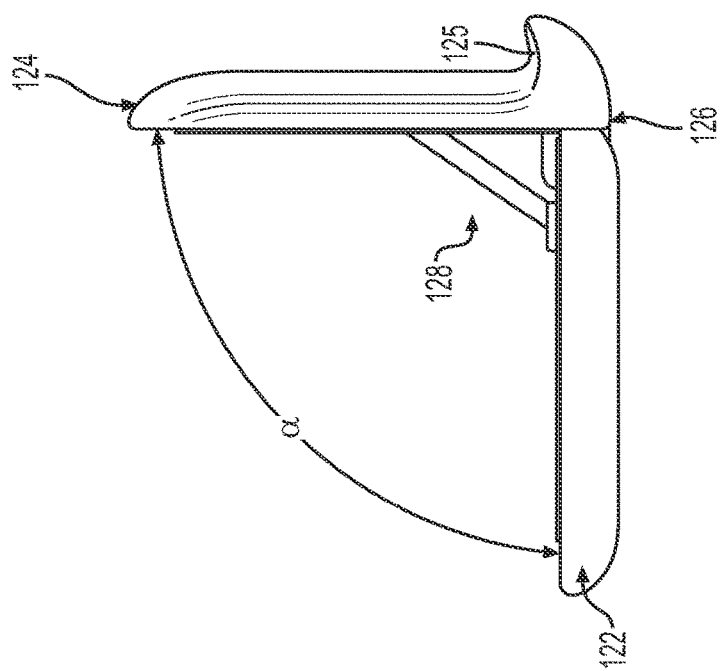

TABLET HOLDER

BACKGROUND OF THE INVENTION

1. Field of the Invention

The present invention relates a tablet holder that can be adjusted to numerous viewing angles and a method of assembling same.

2. Related Art

This section provides background information related to the present disclosure which is not necessarily prior art.

During the hustle and bustle of daily life, we rely heavily on tablets and other mobile devices for entertainment, networking with others, organizing our thoughts, and as a source of information. Oftentimes, our use of mobile devices is concurrent with other recreational or professional activities, which can lead to dropping and damaging the mobile device. While mobile device cases have somewhat improved the risks associated with multitasking, dropped mobile devices can still break and are also likely to accumulate unwanted germs, particularly in public spaces. Attempts have been made to create mobile device holders that include at least one angled surface such that a mobile device (e.g., book, tablet, laptop, or any readable medium) can be placed thereon and held at the angle. Mobile device holders are helpful in many instances as they allow a person to watch or read images at a non-flat viewing angle without the use of their hands. Despite improvements associated with mobile device holders, they are still limited to few angles which are only ergonomic for a user in particular scenarios. For example, the change in the height of a surface that the mobile device is placed can change the desired viewing angle substantially.

Even with these mobile device holders, there is an emerging epidemic of neck problems associated with the use of mobile devices at incorrect viewing angles. Coined "text neck," looking at a mobile device at an incorrect viewing angle for extended periods of time can cause a user's cervical nerve to be pinched, resulting in pain and other neurological symptoms. Accordingly, there is a continuing desire to further develop and refine mobile device holders to ensure a user can comfortably and safely view their mobile device in various scenarios without straining their neck.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a tablet holding assembly for holding a readable medium at various viewing angles is provided. The tablet holding assembly comprises a base portion for placement on a surface and an adjustable portion including a ledge for holding the readable medium. The base portion includes at least one base knuckle and the adjustable portion includes at least one adjustable knuckle aligned with the at least one base knuckle. A hinge assembly including at least one pin extends through the at least one base knuckle and the at least one adjustable knuckle to pivotally connect the base portion to the adjustable portion permitting the adjustable portion to be pivoted between viewing angles.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 10 illustrates a perspective view of a tablet holding assembly in an open position and locked into a desired viewing angle in accordance with the second embodiment of the disclosure;

FIG. 11A illustrates a side view of the tablet holding assembly in a closed position in accordance with the second embodiment of the disclosure;

FIG. 11B illustrates a side view of the tablet holding assembly in a partially open position in accordance with the second embodiment of the disclosure;

FIG. 11C illustrates a side view of the tablet holding assembly in a fully open position in accordance with the second embodiment of the disclosure;

DESCRIPTION OF THE ENABLING EMBODIMENT

Example embodiments will now be described more fully with reference to the accompanying drawings. In general, the subject embodiments are directed to a tablet holding assembly for allowing a user to observe a readable medium at various angles. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the tablet holding assembly is intended for allowing a user to observe a readable medium at various angles. While the readable medium is referred to throughout the application as a mobile device, it should be understood that it can encompass books, magazines, tablets, cellular phones, laptops, and other types of electronic or non-electronic readable mediums without departure from the scope of the subject disclosure.

Figure 1:
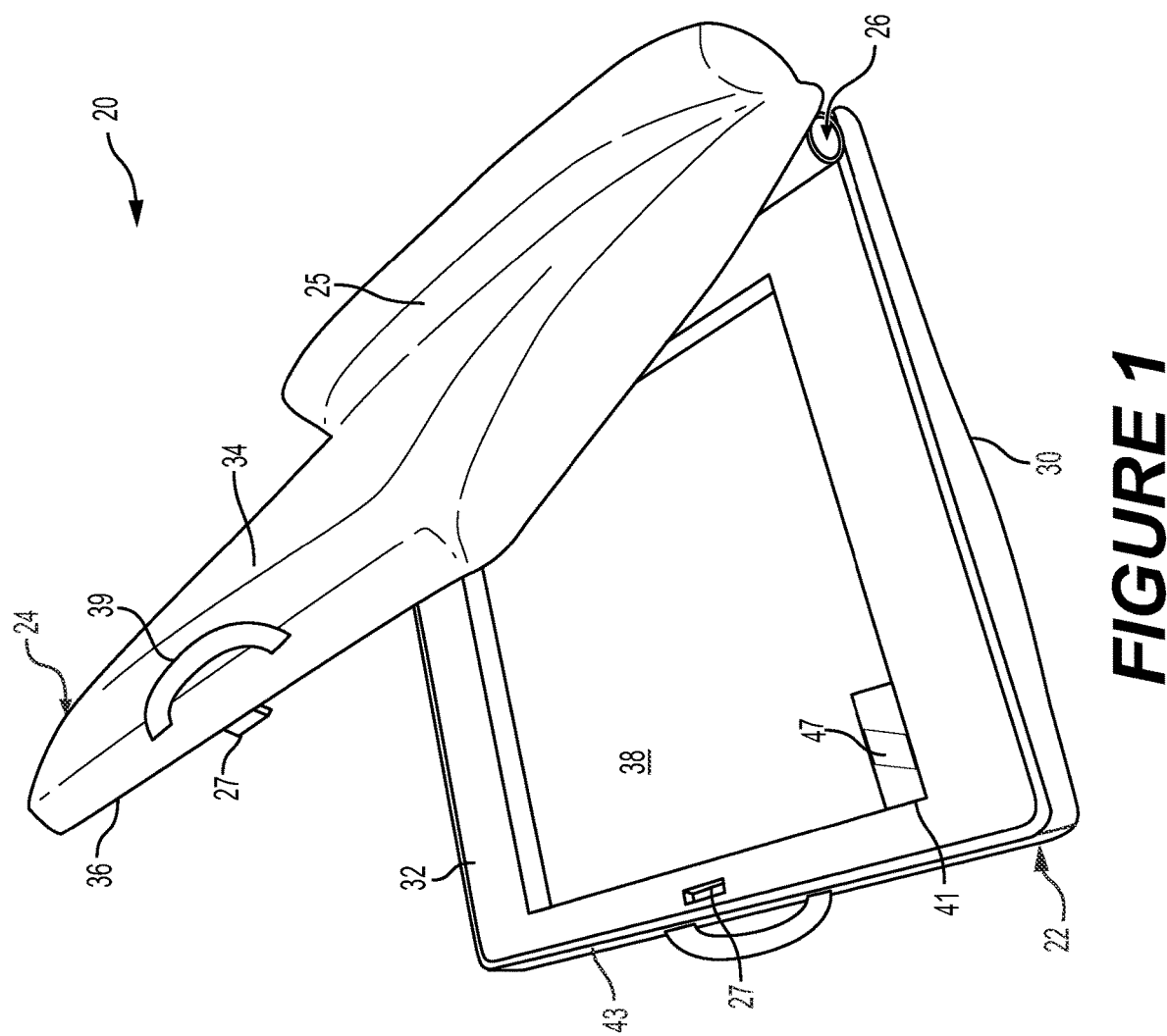
FIG. 1 illustrates a perspective view of a tablet holding assembly in an open position and locked into a desired viewing angle in accordance with a first embodiment of the disclosure.
Figure 2:
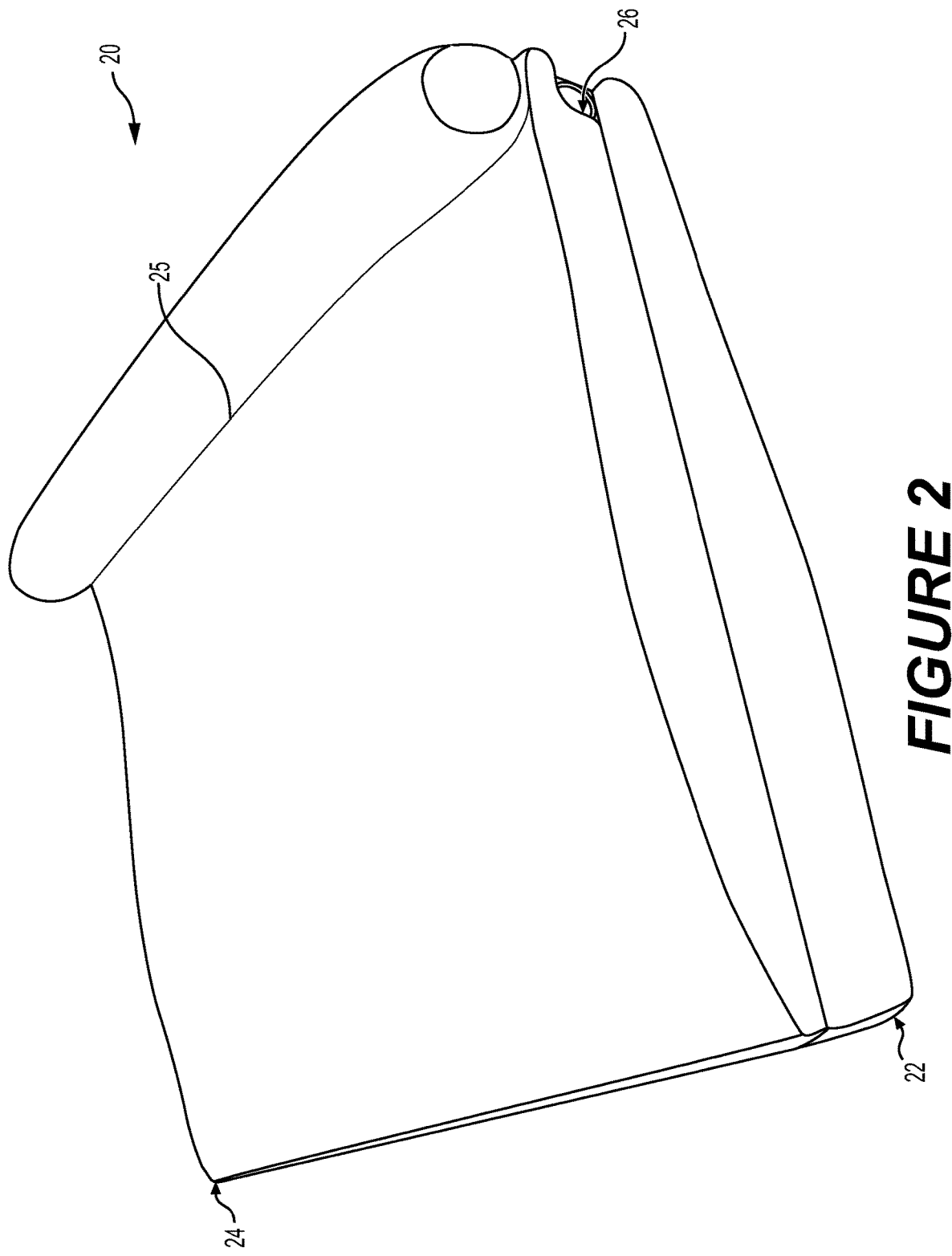
FIG. 2 illustrates a perspective view of a tablet holding assembly in a closed position.

Referring initially to FIGS. 1 and 2, a tablet holding assembly 20 in accordance with a first embodiment is illustrated from a perspective orientation. The tablet holding assembly 20 includes a base portion 22 and an adjustable portion 24. The adjustable portion 24 includes a ledge 25 that the mobile device can sit on. The ledge 25 may include a hook-shape to at least partially cradle the mobile device or may be flat. In use, the base portion 22 can be placed on a surface while the adjustable portion 24 holds a mobile device and can be angularly adjusted to one of numerous viewing angles. The viewing angles range from a flat position, wherein the base portion 22 and the adjustable portion 24 are parallel (FIG. 2), and an inclined position, wherein the adjustable portion 24 extends at a non-zero angle with respect to the base portion 22, for example up to a 90° angle or less including any intermediate angles. In some embodiments, the hook-shaped ledge 25 may permit viewing angles above the 90° angle. The base portion 22 and the adjustable portion 24 are connected together via a hinge assembly 26 that allows the adjustable portion 24 to pivot between positions. As will be described in greater detail below, the hinge assembly 26 may include a holding mechanism 28 to lock the adjustable portion 24 once it is pivoted to the inclined position at a preferred viewing angle. When the base portion 22 and the adjustable portion 24 are parallel, a clip 27 on the adjustable portion 24 may extend into and connect to an aperture 29 on the base portion 22 to maintain the tablet holding assembly 20 in the flat position. In some embodiments, the clip 27 may be located on the base portion 22 and the aperture 29 may be located on the adjustable portion 24.

The base portion 22 includes a base outer surface 30 and a base inner surface 32 and the adjustable portion 24 likewise includes an adjustable outer surface 34 and an adjustable inner surface 36. When the tablet holding assembly 20 is configured in the flat position, a cavity 38 is formed between the base inner surface 32 and the adjustable inner surface 36. In some embodiments, the cavity 38 is formed by depressions in both the base inner surface 32 and the adjustable inner surface 36. In use, various items may be placed within the cavity 38 such as tablets, magazines, stylus pens, charging chords, battery charger packs, etc. In some embodiments, a strap 39 may be located on at least one of the base portion 22 and the adjustable portion. For example, the straps may be configured as handles for grasping with a hand or a strap for carrying around a shoulder. In some embodiments, a battery charger 41 is located inside of the cavity 38 for charging the tablet or other media device. In some embodiments, a battery charger 41 is held in the cavity 38 with a battery charger holding mechanism 47. The battery charger holding mechanism 47 can include a rubber strap, a door, a bracket, or some combination thereof. In some embodiments, an outer casing 43 may be located around the base portion 22 (e.g., the base outer surface 30) and the adjustable portion 24 (e.g., the adjustable outer surface 34), for example, the outer casing 43 may include a foam and an outer fabric.

Figure 3:
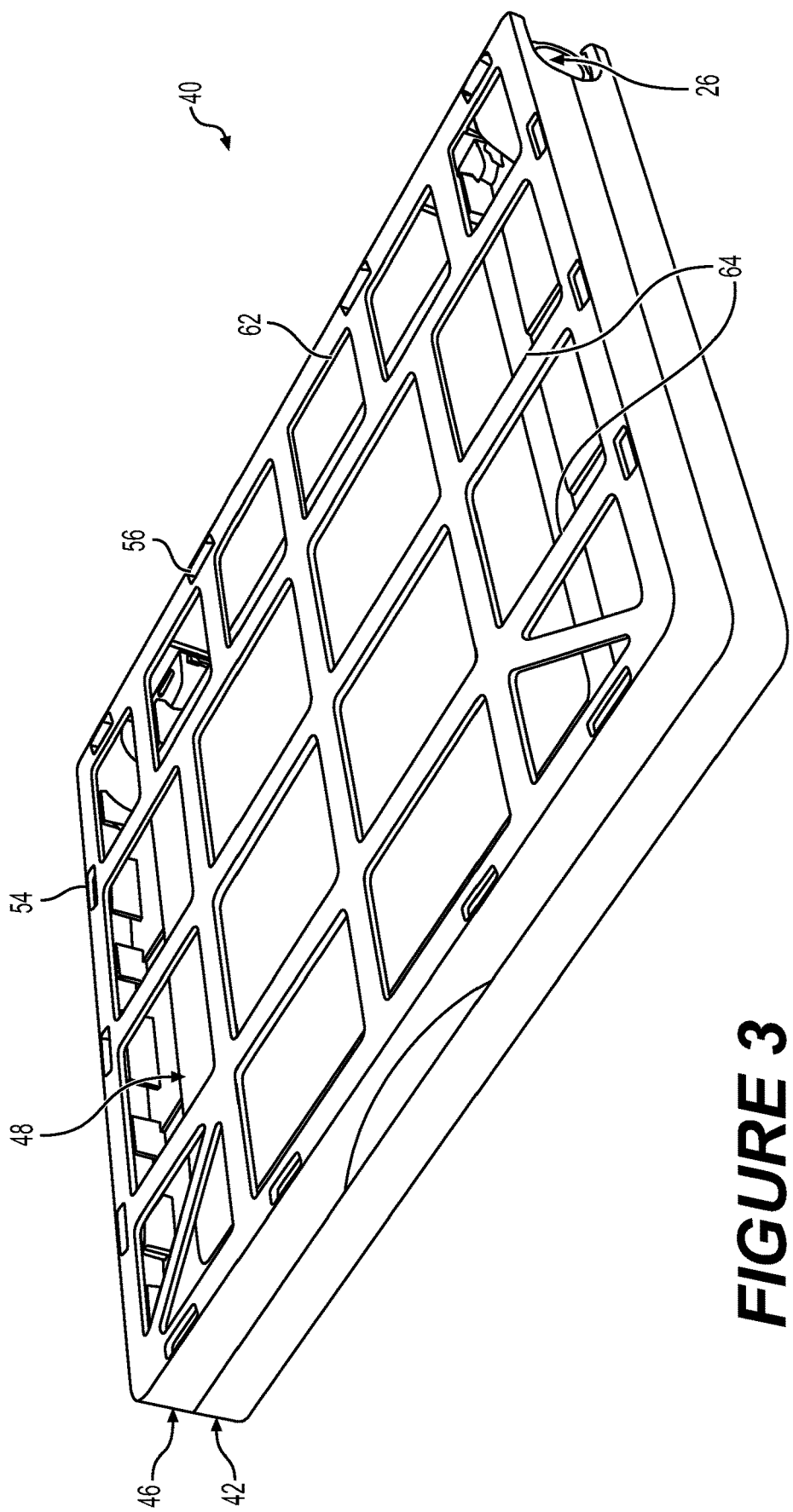
FIG. 3 illustrates a top perspective view of a shell of the tablet holding assembly with an outer casing removed.
Figure 4:
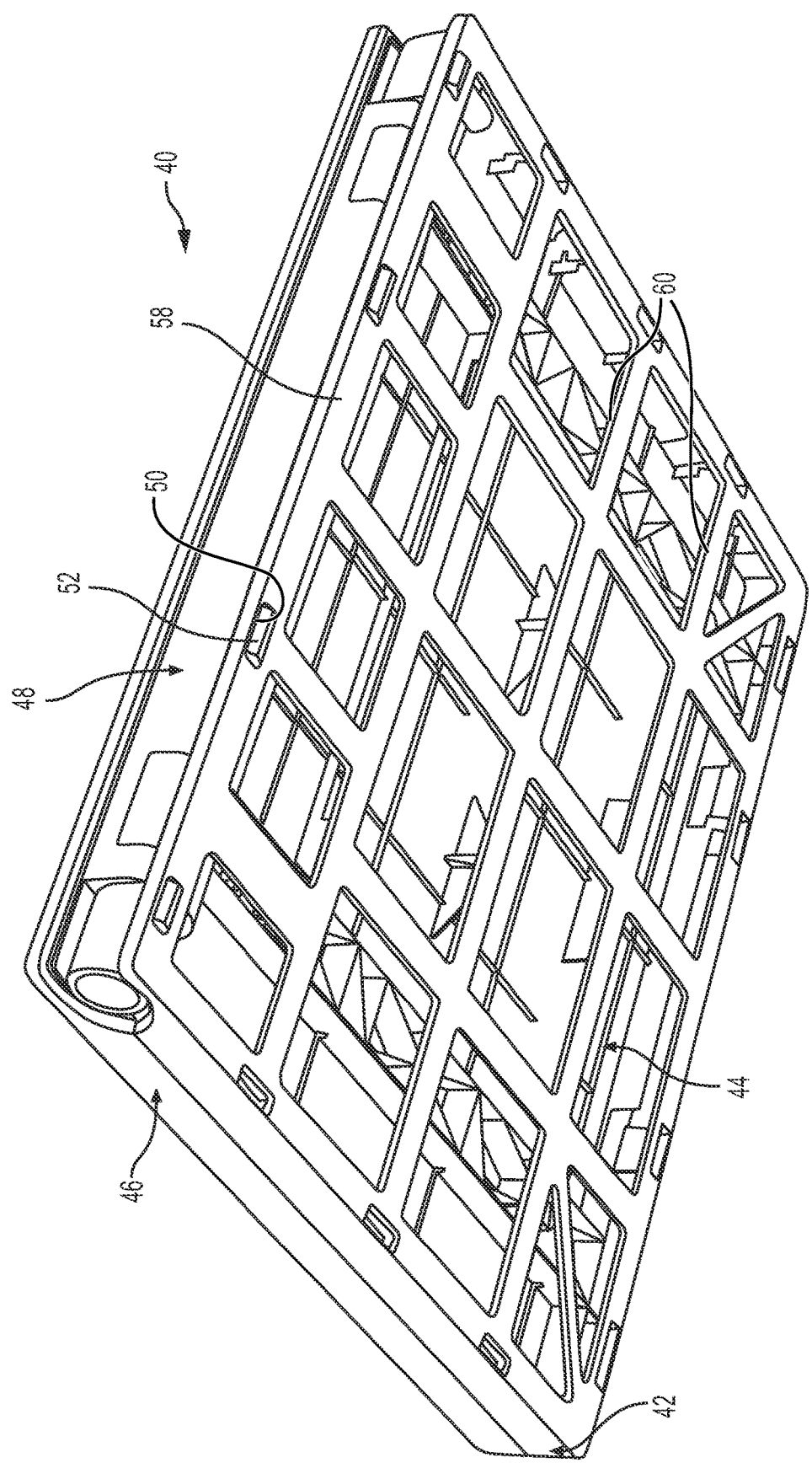
FIG. 4 illustrates a bottom perspective view of the shell with the outer casing removed.

As best illustrated in FIGS. 3 and 4, the tablet holding assembly 20 may include a shell 40 that is wrapped in the outer casing 43. The shell 40 includes an outer base shell 42, an inner base shell 44, an outer adjustable portion shell 46, and an inner adjustable portion shell 48. The outer base shell 42 includes at least one hole 50 and the inner base shell 44 includes at least one clip 52 that extends into and connects to the at least one hole 50 (FIG. 4) for forming the base portion 22. Similarly, the outer adjustable portion shell 46 includes at least one hole 54 and the inner adjustable portion shell 48 includes at least one clip 56 that extends into and connects to the at least one hole 54 (FIG. 3) to form the adjustable portion 24. In some embodiments, the outer base shell 42 includes an outer rim 58 around a peripheral edge thereof and defining the at least one hole 50 and a network of webbing structures 60 extend across the outer rim 58. In some embodiments, the webbing structures 60 permit some elastic movement. In some embodiments, the outer adjustable portion shell 46 includes an outer rim 62 around a peripheral edge thereof and defining the at least one hole 54 and a network of webbing structures 64 extend across the outer rim 62. In some embodiments, the webbing structures 64 permit some elastic movement. In some embodiments, the inner base shell 42 defines the base inner surface 32 and the inner adjustable portion shell 48 defines the adjustable inner surface 36.

Figure 5:
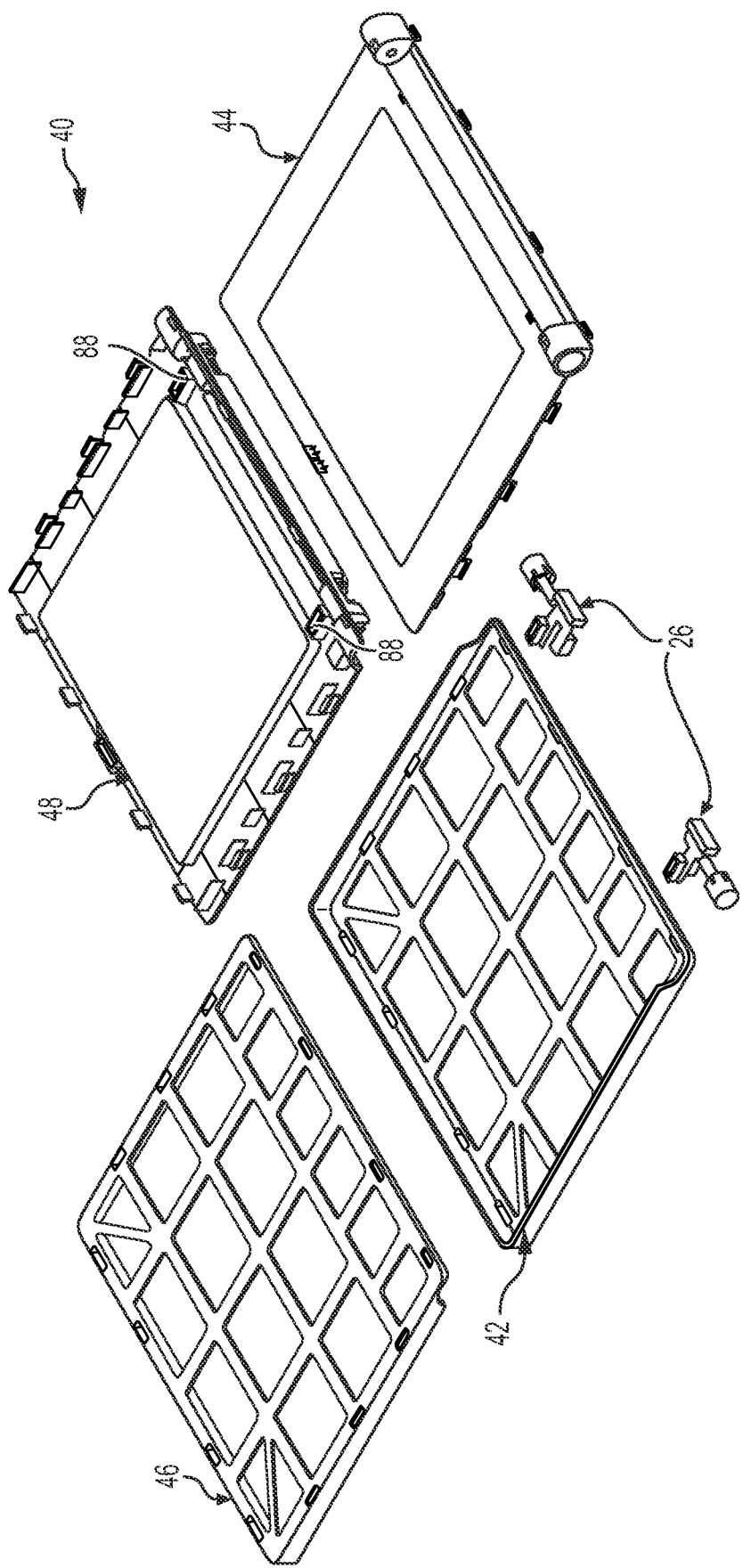
FIG. 5 illustrates a dissembled perspective view of the shell.
Figure 6:
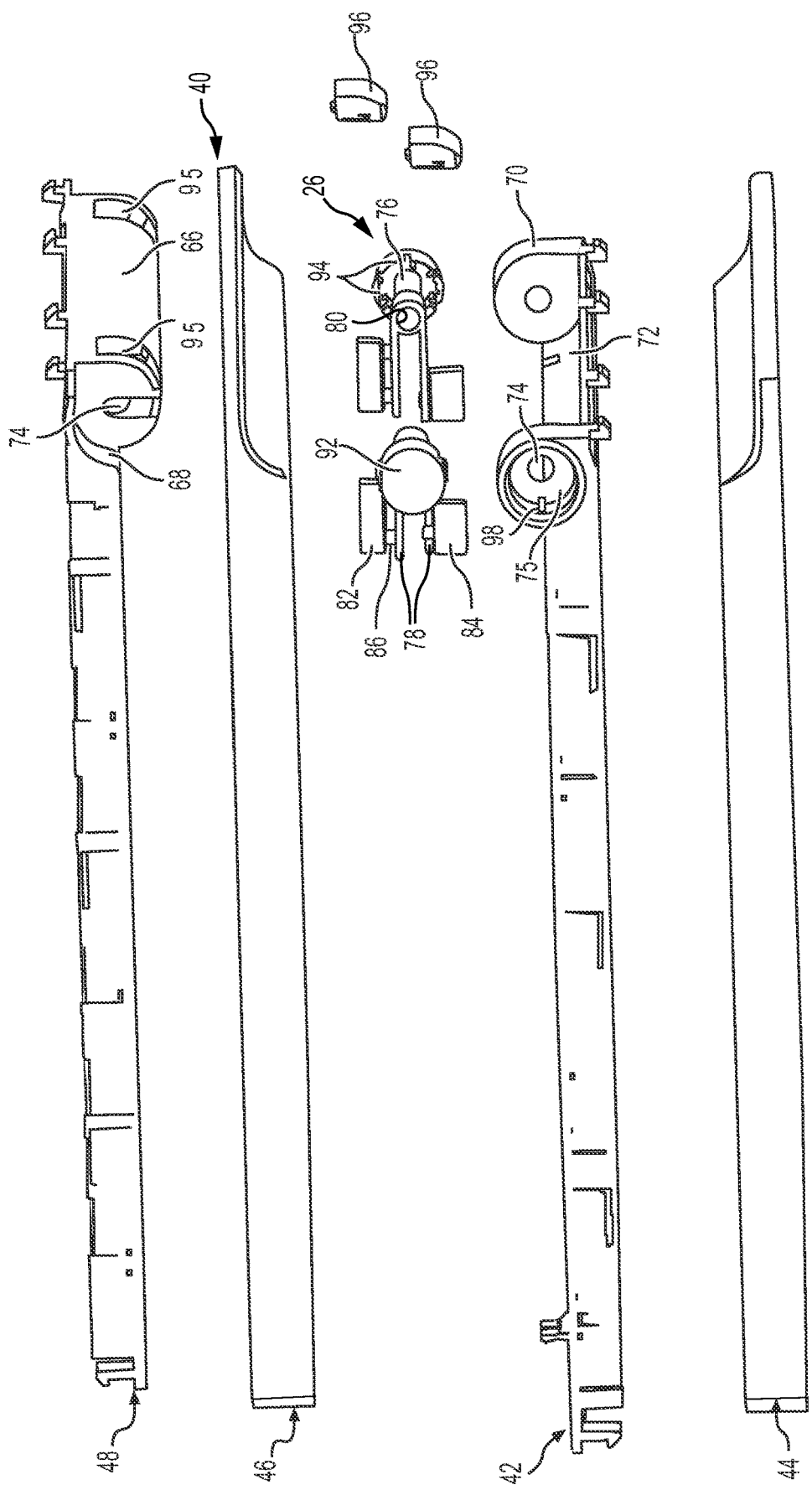
FIG. 6 illustrates a dissembled side view of the shell.

FIGS. 5 and 6 illustrate the tablet holding assembly 20 in a disassembled condition. The inner adjustable portion shell 48 defines at least one adjustable knuckle 66 and at least one base knuckle receiving groove 68 (FIG. 6). The inner base shell 42 likewise includes at least one base knuckle 70 and at least one adjustable knuckle receiving groove 72. When assembled, the at least one adjustable knuckle 66 is located in the at least one adjustable knuckle receiving groove 72 and the at least one base knuckle 70 is located in the at least one base knuckle receiving groove 68. In some embodiments, the inner adjustable portion shell 48 includes one adjustable knuckle 66 located between a pair of base knuckle receiving grooves 68 and the inner base shell 42 includes a pair of base knuckles 70 spaced by an adjustable knuckle receiving groove 72. The adjustable knuckle 66 and the base knuckle 70 each define a pin aperture 74 for receiving at least a portion of the hinge assembly 26. In some embodiments, the base knuckle 70 further includes a bore 75 for locating additional portions of the hinge assembly 26.

As best illustrated in FIG. 6, the tablet holding assembly 20 may include a pair of hinge assemblies 26 that pivotally connect the base portion 22 to the adjustable portion 24. Each hinge assembly 26 includes a pin 76 and a pair of hinge plates 78, each hinge plate 78 including an opening 80 for placement of the pin 76. In operation, one of the hinge plates 78 is connected to the base portion 22 (e.g., the inner base portion shell 42) and one of the hinge plates 78 is connected to the adjustable portion 24 (e.g., the inner adjustable portion shell 48) and the pin 76 extends through the opening 80 of each hinge plate 78. Each hinge plate 78 and pin 76 (e.g., steel) may be constructed of material that is stronger than the base portion shell 42, 44 (e.g., plastic) and the adjustable portion shell 46, 48 (e.g., plastic) for extended operational life. Each hinge assembly 26 further includes an upper holding block 82 and a lower holding block 84. Each holding block 82, 84 includes at least one block pin 86 and each hinge plate 78 includes a block pin aperture for receiving the block pin 86. In some embodiments, the upper holding block 82 is associated with the adjustable portion 24 and the lower holding block 84 is associated with the base portion 22. In some embodiments, the upper holding block 82 includes more block pins 86 than the lower holding block 84. In some embodiments, the inner adjustable portion shell 48 defines a pair of upper holding block housings 88 and the inner base shell 44 defines a lower holding block housings (not shown). Each pin 76 includes a pin head 92 defining a series of spring fingers 94 located circumferentially therearound. The adjustable knuckle 66 includes a pair of openings 95 located adjacent to the pin apertures 74 for accommodating caps 96 that can be removed to obtain access to the hinge assembly 26.

Figure 7:
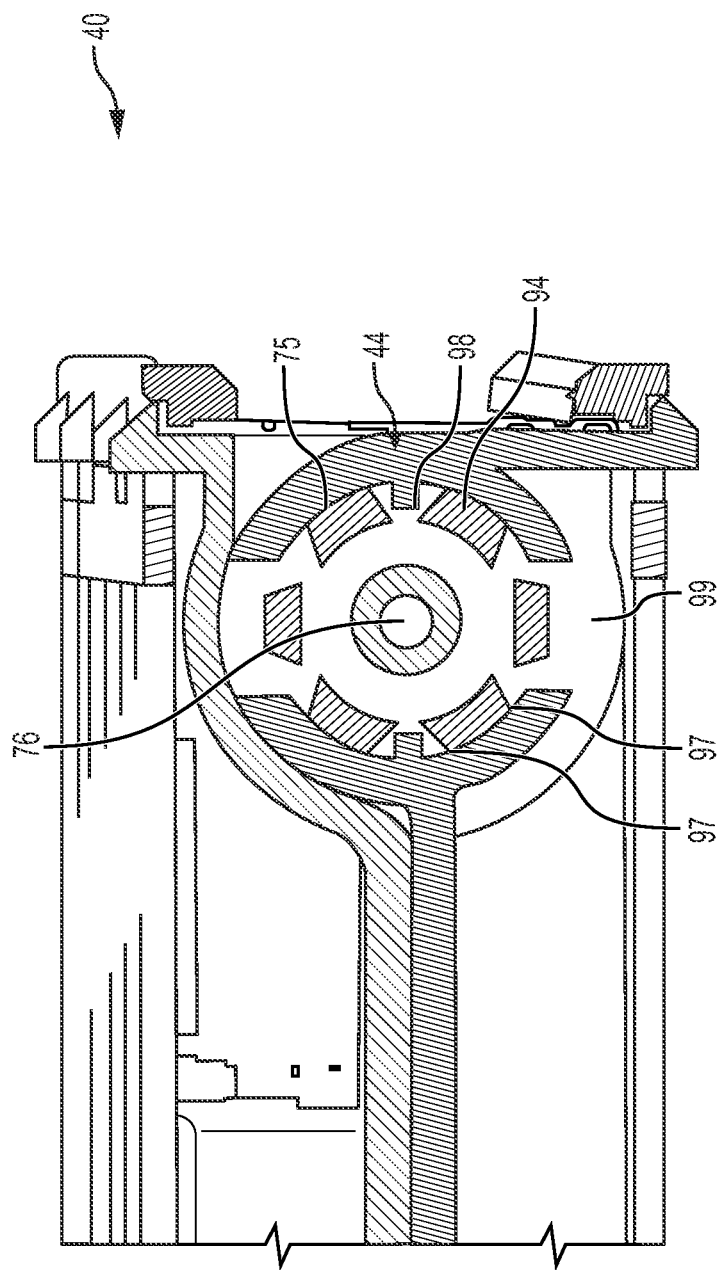
FIG. 7 illustrates a cross-sectional side view taken along a hinge assembly of the tablet holding assembly.

As best illustrated in FIG. 7, when assembled, each of the hinge assemblies 26 extends at least partially through one of the base knuckles 70, the hinge plate 78 connected to the base portion 22, the adjustable knuckle 66, and the hinge plate 78 connected to the adjustable portion 24. The pin 76 extends through the pin aperture 74 defined by the knuckles 66, 70 and the pin head 92 is located in the bore 75. As explained previously, the hinge assembly 26 may include a holding mechanism 28 to lock the adjustable portion 24 once it is pivoted to the inclined position at a preferred viewing angle. In some embodiments, the friction between the pin 76 and the opening 80 of each hinge plate 78 allow the adjustable portion 24 to maintain an angle from the base portion 22. In some embodiments, at least one of the spring fingers 94 and ridge 98 may include an angled surface 97 that permits the spring fingers 94 to be rotated with respect to the ridge 98, wherein the ridge 98 can slot between adjacent spring fingers 94 when aligned therewith and compress circumferentially inwardly via interface with the angled surface 97. With continued reference to FIG. 7, the shell surface defining the bore 75 may further include openings 99 that an aligned spring finger 94 can circumferentially expand into when aligned therewith. The angled surface 97 may be configured to permit continued rotation of the pin 76 via circumferential compression of the spring finger 94 against an edge of the opening 99.

Figure 8:
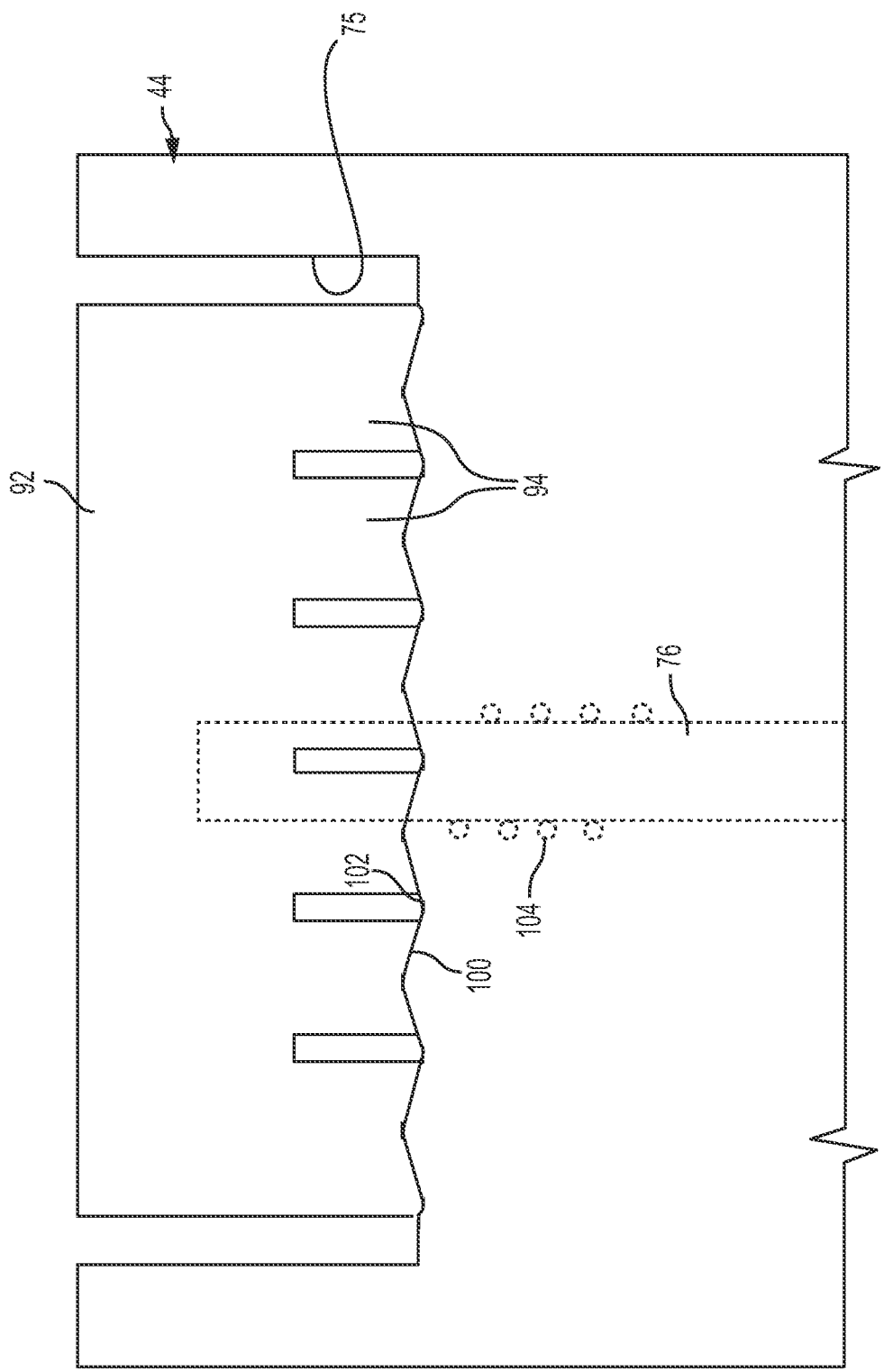
FIG. 8 illustrates a cross-sectional front view of the hinge assembly.
Figure 9:
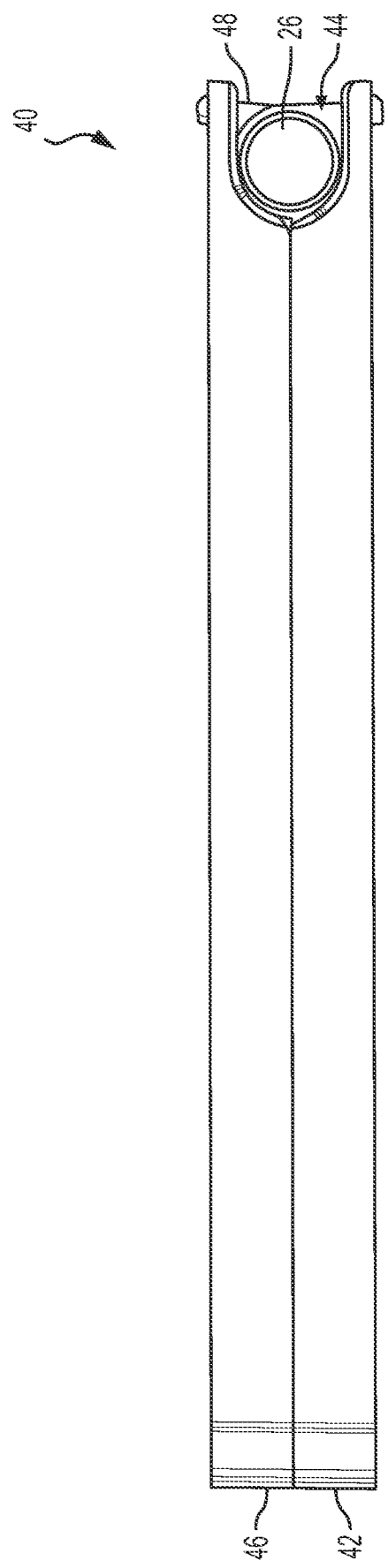
FIG. 9 illustrates a side view of the assembled shell.

With reference now to the sectional illustration in FIG. 8, the pin head 92 may further define a series of pin teeth extending in the direction of the pin 76. The pin teeth 100 may be defined by an outer edge of the pin head 92 (e.g., the spring fingers 94). A bottom surface of the bore 75 may further define a series of shell teeth 102 that are intermeshed with the pin teeth 100. A spring 104 may bias the pin teeth 100 into engagement with the shell teeth 102 such that relative rotation is at least partially locked when the pin teeth 100 and the shell teeth 102 are completely intermeshed. The pin teeth 100 and shell teeth 102 may be circumferentially arrayed and extend generally from a center to an outer circumference. FIG. 9, illustrates a side view of the hinge assembly 26 connected to the shell 40.

Referring now to FIG. 10, a tablet holding assembly 120 in accordance with a second embodiment is illustrated from a perspective orientation. Unless otherwise indicated, the second embodiment may share elements, features, materials, and method of assembly as the first embodiment. The tablet holding assembly 120 includes a base portion 122 and an adjustable portion 124. The adjustable portion 124 includes a ledge 125 that the mobile device can sit on. The ledge 125 may include a hook-shape to at least partially cradle the mobile device. In use, the base portion 122 can be placed on a surface while the adjustable portion 124 holds a mobile device and can be angularly adjusted to one of numerous viewing angles. The viewing angles range from a flat position, wherein the base portion 122 and the adjustable portion 124 are parallel (see FIG. 11A), and an inclined position, wherein the adjustable portion 124 extends at a non-zero angle with respect to the base portion 122, for example up to a 90° angle or more (FIG. 11C) or any intermediate angles (see FIG. 11B). The base portion 122 and the adjustable portion 124 are connected together via a hinge assembly 126 that allows the adjustable portion 124 to pivot. A holding mechanism 128 is used to lock the adjustable portion 124 once it is pivoted to the inclined position at a preferred viewing angle.

Figure 12A:
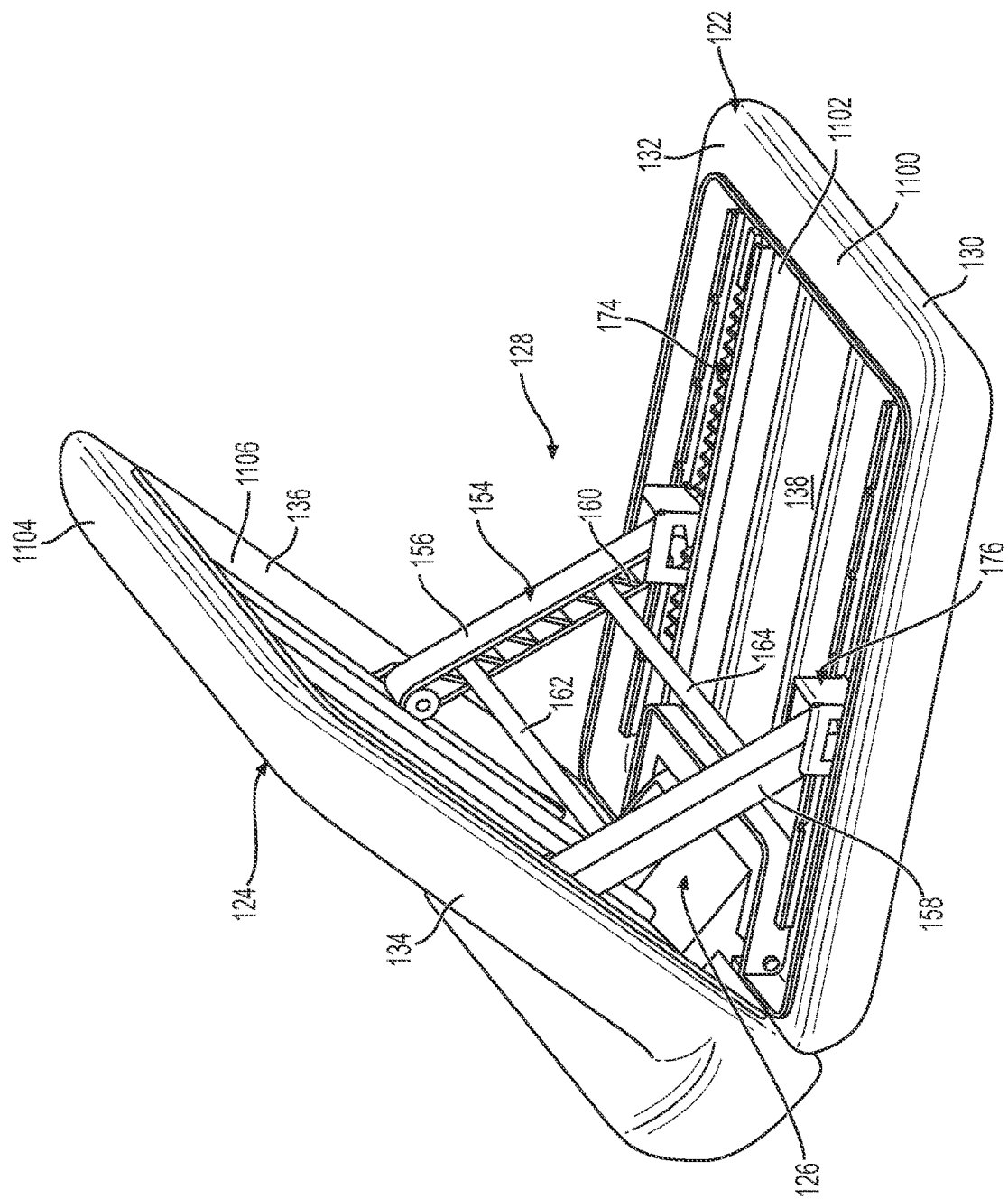
FIG. 12A is a rear perspective view of the tablet holding assembly illustrating the hinge assembly that allows the tablet holding assembly to be positioned at multiple viewing angles.

With reference to FIG. 12A, the base portion 122 includes a base outer surface 130 and a base inner surface 132 and the adjustable portion 124 likewise includes an adjustable outer surface 134 and an adjustable inner surface 136. When the tablet holding assembly 120 is configured in the flat position, a cavity 138 is formed between the base inner surface 132 and the adjustable inner surface 136. The cavity 138 retains the holding mechanism 128 such that the base portion 120 and adjustable portion 124 can sit together flatly (i.e., a parallel orientation). In one arrangement, the cavity 138 is formed by depressions in both the base inner surface 132 and the adjustable inner surface 136. In addition to retaining the holding mechanism 128, other items may be placed within the cavity 138 such as stylus pens, charging chords, battery charger packs, etc.

Figure 12B:
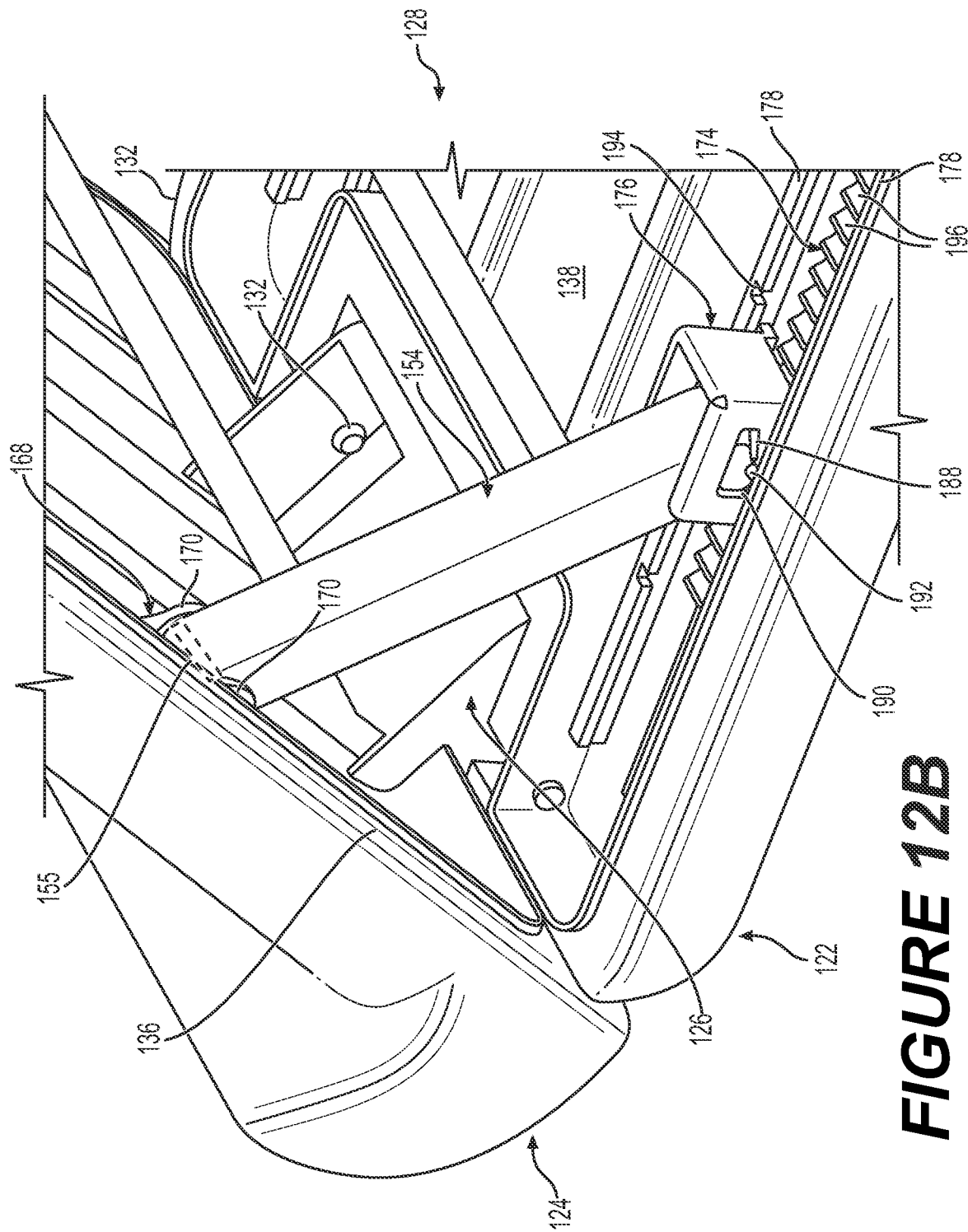
FIG. 12B is a close-up perspective view of the hinge assembly.
Figure 12C:
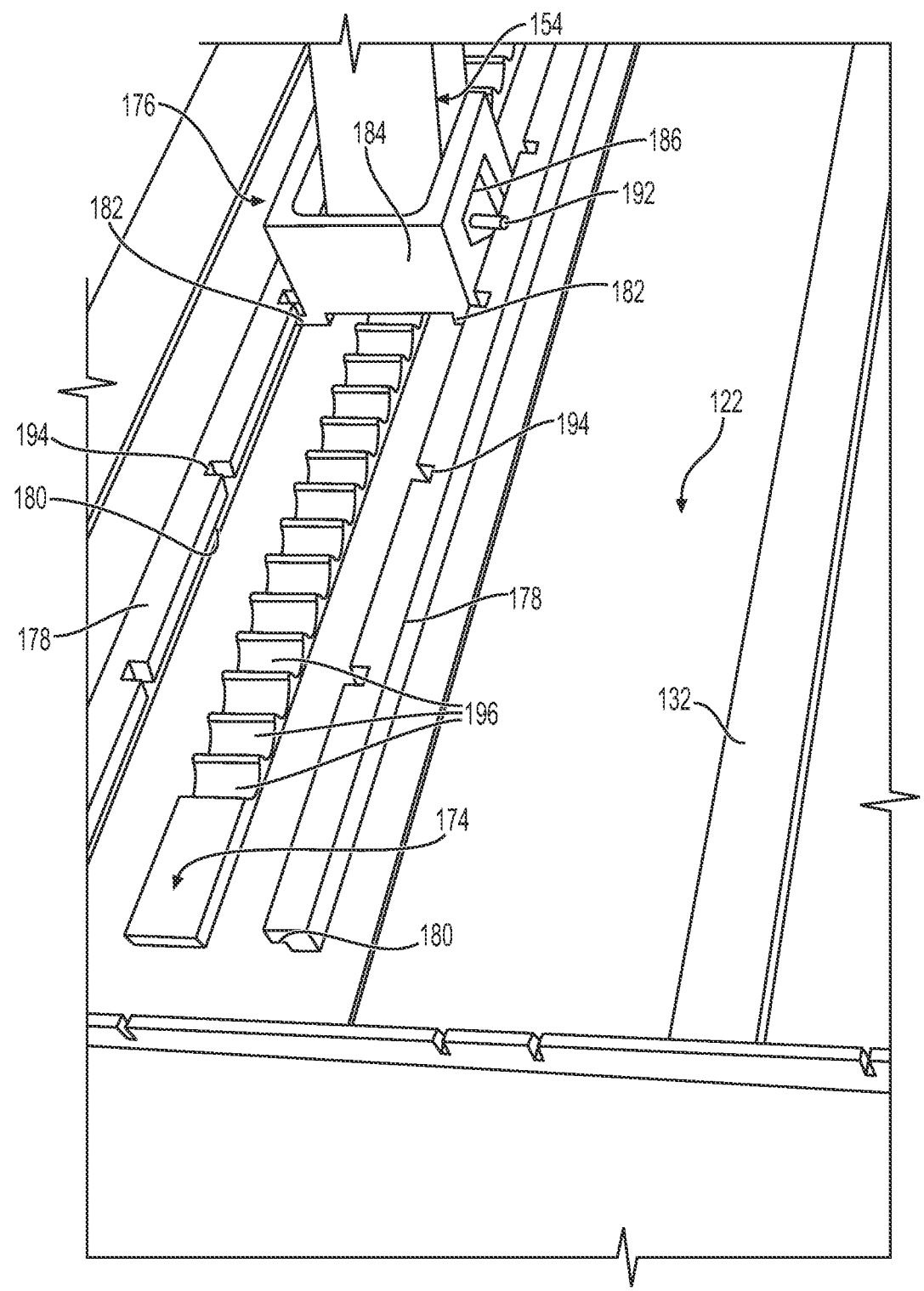
FIG. 12C is a rear view illustrating a holding mechanism that locks the tablet holding assembly at a desired viewing angle.
Figure 13:
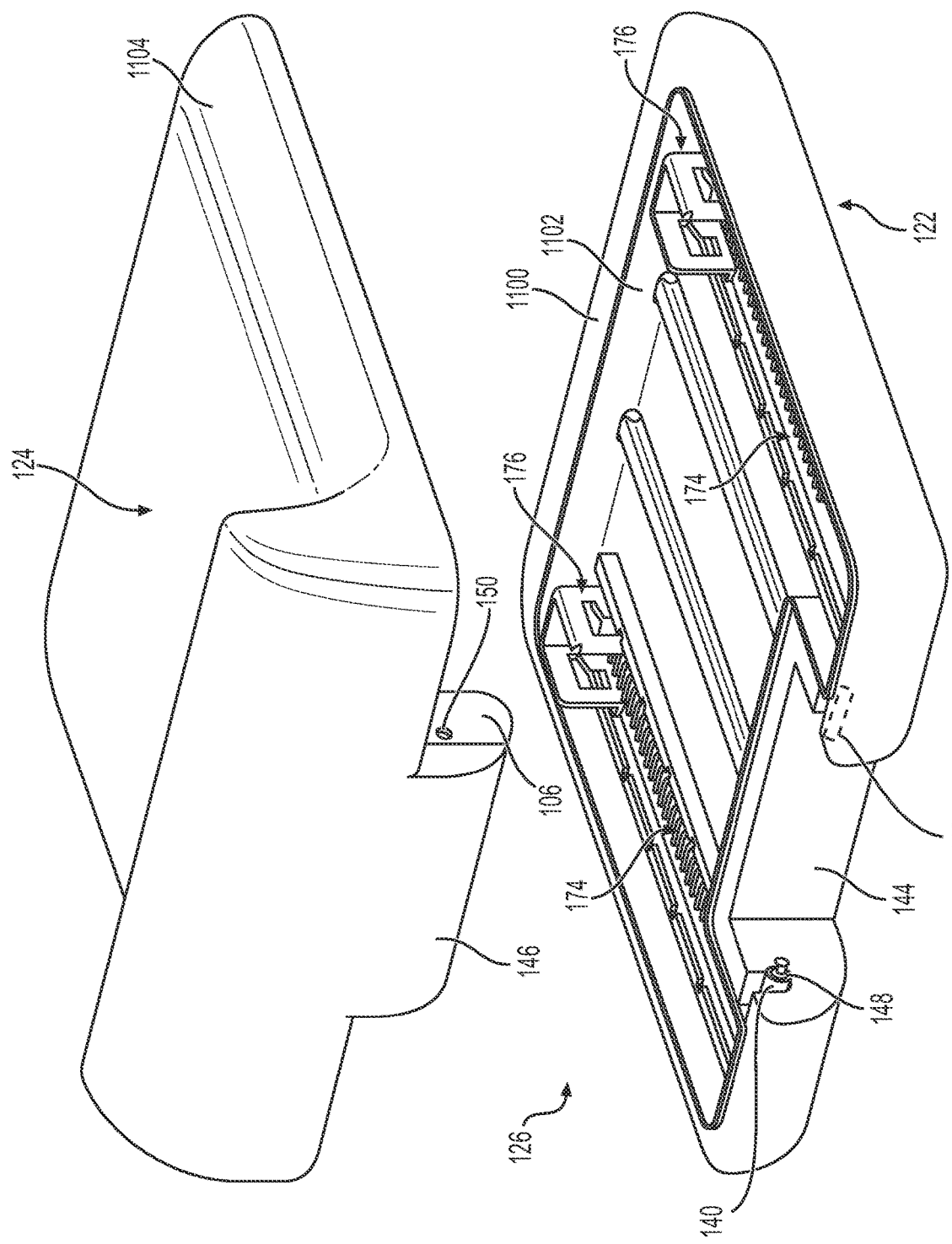
FIG. 13 is a disassembled view of the tablet holding assembly.

As best illustrated in FIGS. 12A through 13, the hinge assembly 126 includes at least one pin 140 (FIG. 14) that is connected to the base portion 122 and extends through the adjustable portion 124. The at least one pin 140 is rotatable with respect to one or both of the base portion 122 and the adjustable portion 134. In one arrangement, the at least one pin 140 includes a second pin 142. The base portion 122 includes a recess 144 along a peripheral edge and the adjustable portion 124 includes a knuckle 146 that extends downwardly into the recess 132. The at least one pin or first pin 140 extends into one side of the recess 144 and the second pin 142 extends into an opposite side of the recess 144. Each pin 140, 142 extends to a terminal end and includes an annular groove 148 that is located close to the terminal end. The knuckle 146 includes a pair of oppositely located holes 150 for being inserted into by respective pins 140, 142. The interior surface of the knuckle 146 may include a shield 152 (see FIG. 12B) that covers the terminal end of the at least one pin 140 to prevent entanglement with other objects during rotation.

With continued reference to FIGS. 12A and 12B, the holding mechanism 128 includes a bracket 154 that is pivotally attached to the adjustable inner surface 136 of the adjustable portion 124 and slideably attached to the base inner surface 132. More particularly, the bracket 154 includes at least one beam 156 that may include a first beam 156 and a second beam 158. Each beam 156, 158 extends between opposite ends and includes one pivot end pivotally attached to the adjustable portion 124 and one slideable end slideably attached to the base portion 122. Each pivot end includes an aperture 155 for retaining a pin. Each beam 156, 158 further includes an interior structural beam webbing 160. At least one cross-member 162 which may include a first cross-member 162 and a second cross-member 164 extend between and space respective beams 156, 158. As best shown in FIG. 12B, a brace 168 is located on the adjustable inner surface 136 for each beam 156, 158. The brace 168 includes a pair of fingers 170 for placement on either side of the at least one beam 156. The pin thus extends between fingers 170 through the beam aperture 155 such that the at least one beam 156 can pivot with respect to the adjustable portion 124. The base inner surface 132 includes a track 174 and a carriage 176 for the at least one beam 156. More particularly, the carriage 176 connects to the slideable end the beam 156 and, with the slideable end, travels along the track 174. As such, one end of the bracket 154 is pivotally attached to the brace 168 on the adjustable portion 124 and the other end of the bracket 154 is connected to a carriage 176 that is slideable along the base portion 122.

As best shown in FIGS. 12B and 12C, in order to retain the carriage 176 at certain positions along the track 174, the track 174 includes a pair of rails 178 each having an undercut 180. The carriage 176 includes a pair of flanges 182 that fit within respective undercuts 180 such that they can move or slide along the track 174 but cannot be removed therefrom. The carriage 176 further includes sidewalls 184 extending upwardly from the flanges 182 that define apertures 186 having a generally L-shape that includes a horizontal portion 188 and a vertical portion 190. The horizontal portion 188 is generally located above the rails 178 and the vertical portion 190 extends to the flange 182. The beam 154 fits within an opening between the sidewalls 184 and includes at least one or two projections 192 that fit within the apertures 186. Pairs of slots 194 extending downwardly from each rail 178 into the undercut 180 are spaced serially along the track 174. The track 174 includes a bottom surface having a plurality of curved grooves 196 and the slideable end of the beam 154 includes a curved profile similar to that of the grooves 196.

In operation, the projections 192 on the beam 152 fit within respective carriage apertures 186. When the projections 192 are located within the horizontal portion 188 of the aperture 186, they are located above the respective rail 178. As the carriage 176 travels along the track 174, the projections 192 encounter the serially spaced slots 194 and are free to travel downwardly into the vertical portion 190 of the aperture 186 and into the slot 194. The vertical portion 190 may be shaped such that the projections 192 cannot enter the undercut 180 when located at the lowest point thereof, thus locking the carriage 176 from continued movement along the track 174. Similarly, the spacing between the projections 192 on the slideable end may be such that when the slideable end seats within the curved grooves 196, the projections 192 are held above the undercut 180 but below the rail 178. However, when the slideable end is located between curved grooves 196, the projections 192 may be held above the rail 178. The spacing of the slots 194 can be such that the angles can be set at specific angles, for example, every 1°, every 15°, every 10°, every 120°, every 125°, or every 130°. The mechanical operation of the holding mechanism 128 provides a large number of angular options with a sturdy configuration.

As best shown in FIGS. 12A and 13, the base portion 122 further includes an outer base layer 100 and an inner base layer 102. The adjustable portion 124 similarly includes an outer adjustable layer 104 and an inner adjustable layer 106. In one arrangement, both outer layers 100, 104 are formed of a soft material while both inner layers 102, 106 are formed of a hard material. Accordingly, the mechanical features of the design may be sturdy and rigid while the user interface portion is soft and comfortable. During construction, the outer layers 100, 104 and inner layers 102, 106 can be formed whereafter the inner layers 102, 106 can then be pressed into inner-layer sized recesses of the outer layers 100, 104 and mechanically connected to each other. The soft material may include one of polyurethane foam, memory foam, and latex foam. The soft material may further include a high-density foam, i.e., a stronger cell structure. The hard material may include hard plastic, such as high-density polyethylene, PVC, Acrylic, Nylon based, etc. A layer of fabric 108 may cover the outer layers 100, 104. The layer of fabric may be generally removable such that it can be periodically washed and/or replaced.

Figure 14:
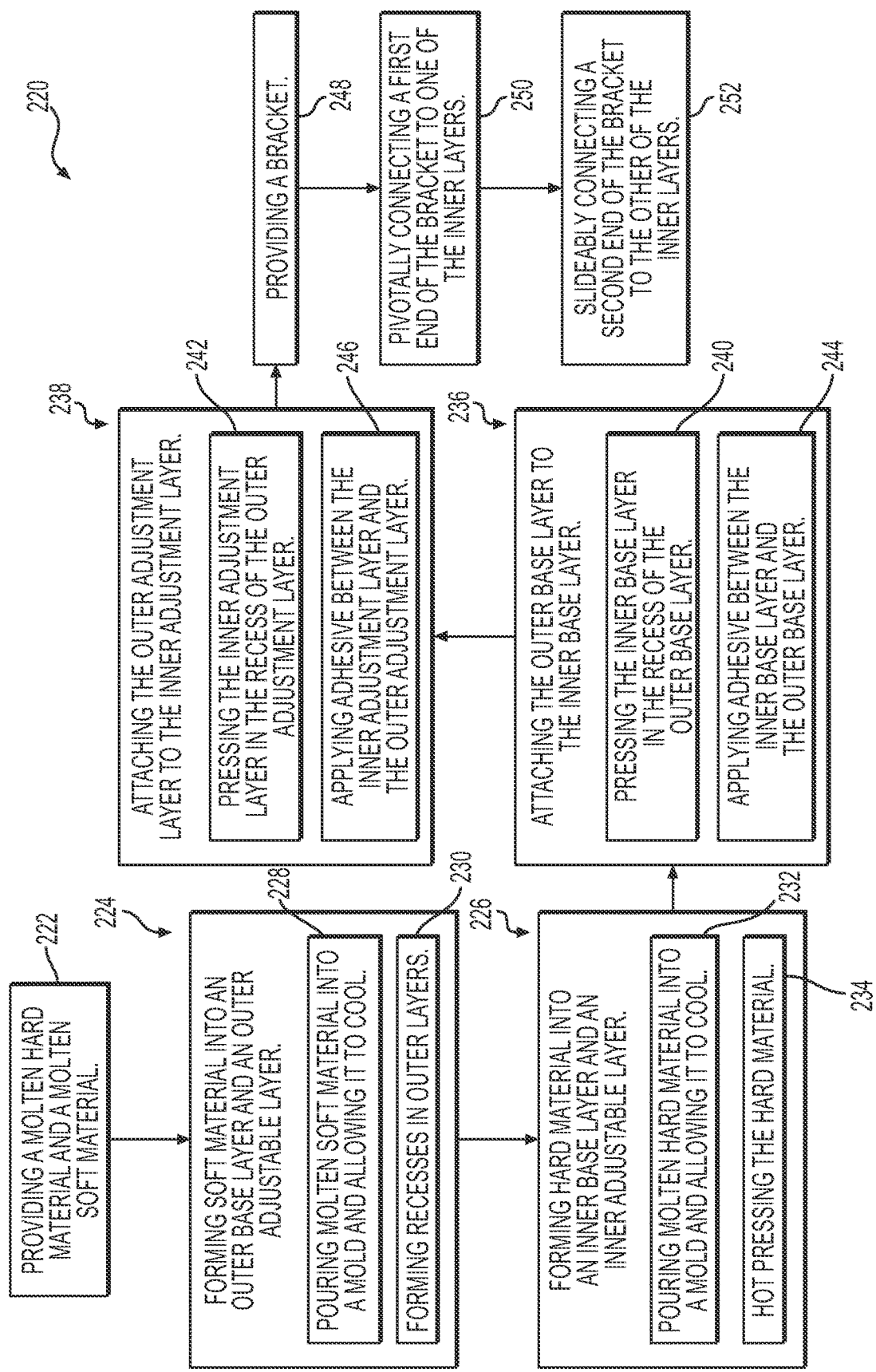
FIG. 14 is a method flow chart illustrating a process of constructing the tablet holding assembly.

FIG. 14 provides a method flow 220 chart illustrating a process of constructing the tablet holding assembly in accordance with the second embodiment. The method 220 begins by providing 222 a molten hard material and a molten soft material. Next, the soft material is formed 224 into an outer base layer and an outer adjustable layer and the hard material is formed 226 into an inner base layer and an inner adjustable layer. The steps of forming 224 the soft material may further include pouring 228 the molten soft material into a mold and allowing it too cool and forming 230 an inner layer sized, or slightly smaller, recess. The steps of forming 226 the hard material may include pouring 232 the molten hard material into a mold and allowing it to cool are/or other hot pressing 234 techniques. Once formed 224, 226, the outer base layer is attached 236 to the inner base layer and the outer adjustable layer is attached 238 to the inner adjustable layer. Steps 228 and 230 may further include pressing 240 the inner base layer into the outer base layer recess and pressing 242 the inner adjustable layer into the outer adjustable layer recess. Steps 224, 226, may further include applying 244 an adhesive to one of the base layers and applying adhesive 246 to one of the adjustable layers before attachment 236, 238. The method 220 continues by providing 248 a bracket and pivotally connecting 250 a first end of the bracket one of the inner layers and slideably connecting 252 the bracket to the other of the inner layers.

While the base portion 22, 122 and adjustable portion 24, 124 may both have a generally cuboid-shape. It should be appreciated that other shapes may be adopted without departure from the subject disclosure. For example, portions 22, 24, 122, 124 may be oval, circular, triangular, or other shapes.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A tablet holding assembly for holding a readable medium at various viewing angles comprising:
a base portion for placement on a surface;
an adjustable portion including a ledge for holding the readable medium;
the base portion including at least one base knuckle and the adjustable portion including at least one adjustable knuckle aligned with the at least one base knuckle; and
a hinge assembly including at least one pin extending through the at least one base knuckle and the at least one adjustable knuckle to pivotally connect the base portion to the adjustable portion,
wherein the at least one pin includes a head defining a series of spring fingers extending towards an end of the at least one pin opposite the head.

2. The tablet holding assembly of claim 1, wherein the at least one base knuckle includes a pair of base knuckles spaced on either side of the at least one adjustable knuckle and the at least one pin includes a first pin extending through one of the base knuckles and into the at least one adjustable knuckle and a second pin extending through the other of the base knuckles and into the at least one adjustable knuckle.

3. The tablet holding assembly of claim 2, wherein the hinge assembly includes a first hinge plate coupled to the base portion and a second hinge plate coupled to the adjustable portion.

4. The tablet holding assembly of claim 3, wherein the first hinge plate extends from the base portion to an opening and the second hinge plate extends from the adjustable portion to an opening and the first pin is located in the opening of the first hinge plate and the second pin is located in the opening of the second hinge plate.

5. The tablet holding assembly of claim 4, wherein a friction is formed between the pin and at least the opening of the second hinge plate to hold the adjustable portion at a desired angle from the base portion.

6. The tablet holding assembly of claim 1, wherein the pin head is located in a bore defined by one of the at least one base knuckle and the at least one adjustable knuckle.

7. The tablet holding assembly of claim 6, wherein the bore is at least partially defined by a ridge that slots between spring fingers to hold the adjustable portion at a desired angle from the base portion.

8. The tablet holding assembly of claim 6, wherein a surface defining the bore further defines an opening adjacent to the bore and the spring fingers are circumferentially compressed such that when a spring finger is aligned with the opening it expands circumferentially outwardly to hold the adjustable portion at a desired angle from the base portion.

9. The tablet holding assembly of claim 6, wherein a bottom surface of the bore defines a series of shell teeth and the pin includes a series of pin teeth biased into the shell teeth.

10. The tablet holding assembly of claim 1, wherein the base portion defines a base inner surface and the adjustable portion includes an adjustable portion inner surface, wherein the base inner surface and the adjustable portion inner surface define a cavity for carrying items therein.

11. The tablet holding assembly of claim 10, wherein a battery charger holding mechanism is located in the cavity.

12. The tablet holding assembly of claim 10, wherein the tablet holding assembly includes a shell wrapped in an outer casing.

13. The tablet holding assembly of claim 12, wherein the outer casing includes a foam wrapped in fabric.

14. The tablet holding assembly of claim 12, wherein the shell includes an outer base shell and an inner base shell defining the base portion, and wherein the shell further includes an outer adjustable portion shell and an inner adjustable portion shell defining the adjustable portion.

15. The tablet holding assembly of claim 14, wherein the inner base shell and the inner adjustable shell define the cavity.

16. The tablet holding assembly of claim 15, wherein the outer base shell defines a rim for connection to the inner base shell and a series of structural webbings extending across the rim that permit some elastic movement.

17. The tablet holding assembly of claim 15, wherein the outer adjustable portion shell defines a rim for connection to the inner adjustable shell and a series of structural webbings extending across the rim that permit some elastic movement.

18. The tablet holding assembly of claim 1, wherein the adjustable portion defines a clip and the base portion defines an opening for insertion of the clip wherein the adjustable portion and the base portion are in a closed position.

19. The tablet holding assembly of claim 18, wherein a first strap is connected to the base portion and a second strap is connected to the adjustable portion to facilitate carrying of the tablet holding assembly.

\* \* \* \* \*